United States Patent [19]

Trusock

[11] Patent Number: 4,665,698

[45] Date of Patent: May 19, 1987

[54] HYDRAULIC SYSTEM WITH PROPORTIONAL CONTROL

[75] Inventor: George J. Trusock, Battle Creek, Mich.

[73] Assignee: Clark Equipment Company, South Bend, Ind.

[21] Appl. No.: 719,336

[22] Filed: Apr. 3, 1985

Related U.S. Application Data

[63] Continuation of Ser. No. 486,201, Apr. 18, 1983, abandoned.

[51] Int. Cl.[4] .............................................. F16D 31/02

[52] U.S. Cl. ........................................ 60/422; 60/911; 60/427

[58] Field of Search ................. 60/420, 422, 423, 427, 60/DIG. 911; 180/132; 417/316, 317

[56] References Cited

U.S. PATENT DOCUMENTS

| | | | |
|---|---|---|---|
| 3,443,380 | 5/1969 | Karazija | 60/911 |
| 3,512,072 | 5/1970 | Karazija et al. | 60/911 |
| 3,630,025 | 12/1971 | Henry | 60/911 |
| 3,875,747 | 4/1975 | Briggs | 60/420 |
| 3,991,846 | 11/1976 | Chichester et al. | 60/423 |
| 4,012,175 | 3/1977 | Simonds, Jr. | 417/316 |
| 4,070,857 | 1/1978 | Wible | 60/422 |
| 4,100,739 | 7/1978 | Shaffer | 60/911 |
| 4,119,898 | 10/1978 | Morton et al. | 318/341 |
| 4,144,946 | 3/1979 | Melocik | 60/911 |
| 4,505,111 | 3/1985 | Okamoto et al. | 60/911 |

*Primary Examiner*—Henry A. Bennet

*Attorney, Agent, or Firm*—Reising, Ethington, Barnard, Perry & Milton

[57] ABSTRACT

An hydraulic control system is disclosed for energizing a load, such as the lift cylinder of an electric lift truck, with a minimum of power loss during the transition from zero to full energization, i.e. during the feathering range. An electric motor drives a positive displacement pump which supplies the flow requirements of different load circuits, one having a greater flow requirement than the other and requiring higher pump speed. A proportioning valve of the open center type provides full flow to the tank when the valve is closed and full flow to the load circuit having the greater flow requirement when the valve is open. A manually actuable lever actuates the valve through the feathering range with the pump motor in a low speed range and actuates a speed control switch to operate the motor in the high speed range when the valve is fully open.

9 Claims, 9 Drawing Figures

HYDRAULIC SYSTEM WITH PROPORTIONAL CONTROL

This a continuation of application Ser. No. 486,201 filed on Apr. 18, 1983, now abandoned.

FIELD OF THE INVENTION

This invention relates to hydraulic systems for work vehicles such as lift trucks; more particularly, it relates to a control system which allows gradual energization of an hydraulic load circuit with reduced power loss.

BACKGROUND OF THE INVENTION

In conventional lift trucks it is common practice to use an electric motor to drive a positive displacement lift pump which supplies pressurized fluid to the hydraulic load device including the lift motor. The hydraulic lift motor requires greater hydraulic flow than the other hydraulic load devices, such as the power steering system which typically requires the least hydraulic flow. Certain auxiliary load devices, such as a load handling clamp, require an intermediate value of hydraulic flow. The lift motor is energized with pressurized fluid through a manually controlled lift valve. The lift control valve is an open center, proportioning valve which provides full flow from the inlet port to the tank outlet port with no flow to the load outlet port when the valve is closed. It provides full flow from the inlet port to the load outlet port with no flow to the tank outlet port when the valve is open. In the range between the open and closed conditions there is a functional relationship between the flow to the load port and the valve movement and, even though the functional relationship may be nonlinear, the valve is called a proportioning valve. Such a proportioning valve permits feathering operation of a load device, i.e. gradual energization by gradual opening of the valve in the transition region between the open and closed conditions.

The lift motor is started by moving the lift control lever from the neutral position in the lift direction. The first increment of movement of the control lever actuates a switch which energizes the pump motor with full battery voltage to produce maximum pump flow. At first, the entire hydraulic fluid circulates from the pump outlet through the open center lift valve and returns to the tank. As the control lever is moved further, the lift valve progressively closes the tank return port and progressively opens the lift motor port so there is a decreasing flow to the tank and an increasing flow to the motor in correspondence with the movement of the lift control lever. When the flow resistance at the tank return port is sufficiently great, the back pressure causes the lift motor to lift the load. During the transition from full flow to the tank to full flow to the lift motor, energy is lost in the lift valve in the form of heat due to the pressurized fluid being reduced to the low pressure of the tank.

A general object of this invention is to provide an improved hydraulic control system which overcomes certain disadvantages of the prior art and provides for gradual energization of a load device with minimized power loss.

SUMMARY OF THE INVENTION

According to this invention, an hydraulic load circuit requiring a relatively high flow is energized from a changeable speed pump by opening a proportioning valve through its proportional range with the pump operating in a low speed range and then, when the valve is fully open, increasing the speed of the motor to its high speed range. Thus, feathering operation of the valve occurs at a reduced flow level with a consequent reduction in power loss; initiation of the high speed after the valve is fully open produces the higher flow level required for the load circuit.

Further, in accordance with this invention, a motor control circuit is provided to increase the motor torque in response to increased load so that a heavy load device can be actuated during operation of the motor in the low speed range. This is accomplished by a motor control system in which the motor voltage is increased in response to increased motor current to regulate the motor speed at a substantially constant value or within predetermined limits.

In accordance with this invention, an hydraulic control system provides for energizing a load device by a proportioning valve with a minimum of power loss during the transition from zero to full energization. The system comprises a proportioning valve for controlling the flow from a positive displacement pump to the load circuit, the valve having an inlet port communicating with the pump outlet, a return port communicating with the pump inlet and a load port communicating with the load device. The valve includes means for progressively opening the load port while progressively closing the return port. Control means are provided for energizing the motor for operation in a low speed range during opening of the load port and for energizing the motor for operation in a high speed range when the load port is fully open and the return outlet is fully closed.

Further, in accordance with this invention, an improved proportional lift control is provided for an electric lift truck in which the lift cylinder is energized through its feathering range with a minimum of power loss. An electric motor drives a positive displacement hydraulic pump which supplies the flow requirements of the power steering circuit when the motor is operated in a low speed range. It supplies the flow requirements of the lift circuit when the motor is operated in a high speed range. A lift valve for controlling the flow from the pump to the lift circuit is an open center, proportioning type valve and provides full flow to the tank when the valve is closed and full flow to the lift cylinder when the valve is open. A manually actuable lift lever actuates the lift valve through the feathering range with the pump motor in the low speed range and actuates a speed control switch to operate the motor in the high speed range when the lift valve is fully open.

A more complete understanding of this invention may be obtained from the description that follows, taken with the accompanying drawings.

BEST MODE FOR CARRYING OUT THE INVENTION

Figure 1:
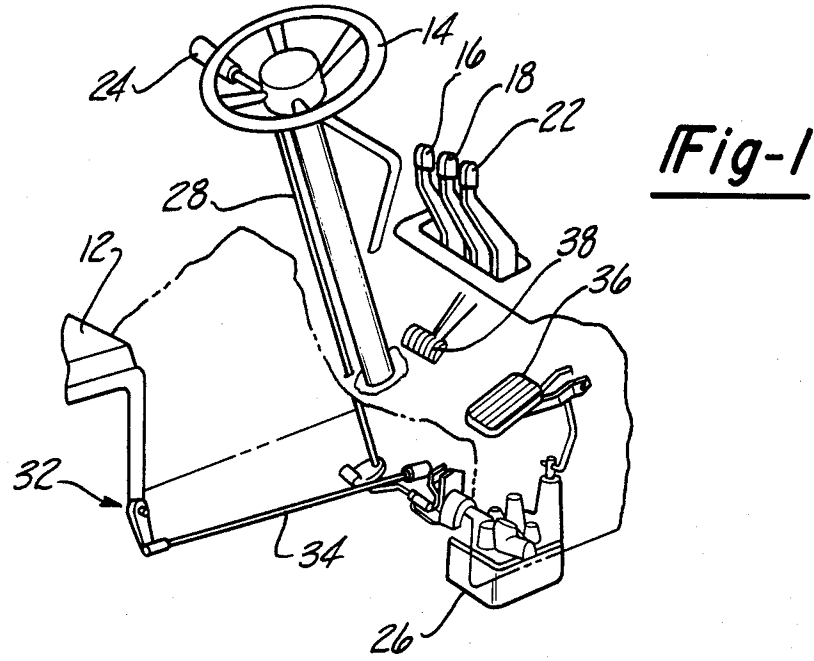
FIG. 1 is a perspective view of a lift truck showing certain manual controls for use by the driver.

Referring now to the drawings, there is shown an illustrative embodiment of the invention in the hydraulic system of a work vehicle, specifically a lift truck. It will be appreciated as the description proceeds that the invention may be employed in other types of work vehicles and is useful in other applications.

GENERAL DESCRIPTION OF THE LIFT TRUCK

Referring now to FIG. 1, an electric lift truck is depicted to show the driver's station and the manual controls for operating the lift truck. In a known manner, but not shown in the drawings, the lift truck is provided with an extendible upright with a lift carriage which is raised or lowered by an hydraulic motor. The upright is mounted on the vehicle frame for pivotal motion about a horizontal axis for tilting forwardly or rearwardly by a pair of hydraulic motors. In addition, the lift truck may be provided with an auxiliary load handling device such as a side shifter, load clamp or rotator.

The lift truck is provided with a driver's station including a seat 12 and a steering wheel 14 which is coupled to the dirigible wheels (not shown) through an hydraulic power steering system which will be described subsequently. The manual controls for load handling functions of the lift truck include a lift control lever 16, a tilt control lever 18 and an auxiliary control lever 22. A drive selector lever 24 is mounted on the steering column and is coupled with a controller 26 which provides starting and speed control of the traction motor. The controller 26, per se, forms no part of the present invention; it does, however, control the actuation of certain switches which affect the operation of the hydraulic system. The drive selector lever 24 is coupled by a suitable linkage 28 with the controller 26 for the selection of neutral, forward, reverse or park modes of operation of the traction motor. Also, a seat occupancy detector 32 is provided as a safety device in the control of the traction motor and the hydraulic system. The detector 32 includes a suitable linkage 34 coupled between the seat 12 and the controller 26. An accelerator pedal 36 is connected through suitable linkage to the controller 26 for starting and speed control of the traction motor. The driver's station additionally includes a foot brake pedal 38 for operation of the service brake of the vehicle.

Figure 2:
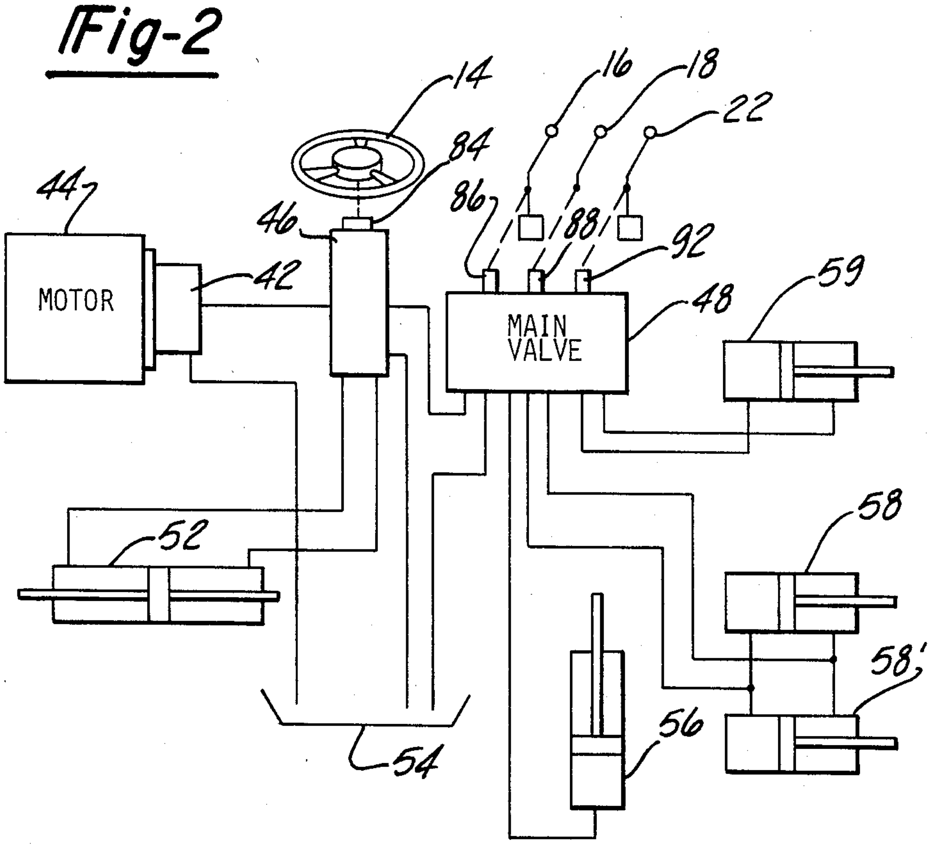
FIG. 2 is a block diagram of the hydraulic system of the truck.

FIG. 2 is a block diagram of the hydraulic system of the lift truck. It comprises a single hydraulic pump 42 of the positive displacement type. The pump is driven by an electric motor 44 which is a DC series motor. The system further comprises a steering unit 46 and a main valve 48. Hydraulic fluid is supplied from the pump 42 to the steering unit 46 and through the steering unit to the main valve 48. The steering unit 46 includes a steering control valve (not shown in FIG. 2) which supplies fluid to the hydraulic motor or steering cylinder 52 for power steering. The steering unit also includes a return to the hydraulic reservoir or tank 54. The main valve 48 supplies fluid to the hydraulic motor or lift cylinder 56 for the lift carriage of the lift truck. Also, the main valve 48 supplies fluid to the hydraulic motors or tilt cylinders

58 and 58' for tilting the upright of the lift truck. Additionally, the main valve 48 supplies fluid to an auxiliary hydraulic motor or cylinder 58. The fluid from the main valve is returned to the tank through a return line.

Figure 3:
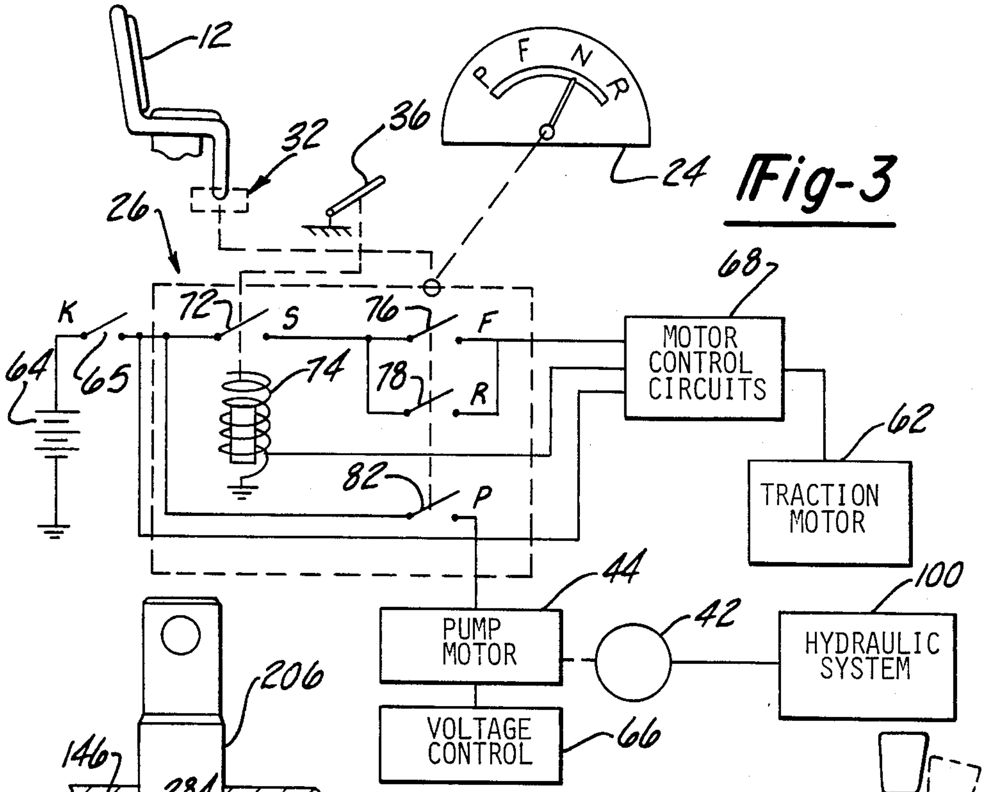
FIG. 3 is a diagram of the electrical system.

FIG. 3 shows the electrical circuits, in block diagram, for energizing the pump motor 44 and for energizing the traction motor 62. The voltage from the vehicle battery 64 is supplied through a key switch 65 to the controller 26 and thence through a pump switch 82 to the pump motor 44. The energizing circuit for the pump motor 44 is completed through a voltage control circuit 66. The pump 42 is connected with the hydraulic system 100. The battery voltage is applied from the controller 26 through the motor control circuits 68 to the traction motor 62. The controller 26 includes switching circuits which are controlled by the drive selector 24, the seat occupancy detector 32 and the accelerator pedal 36 in a manner which will be described presently.

The controller 26 includes a start switch 72 between the battery 64 and the motor control circuit 68. The start switch is actuated by movement of the accelerator pedal 36. A speed control member 74 of the inductive type is coupled with the accelerator pedal and supplies a speed control signal to the motor control circuits 68. Direction control for the traction motor is provided by a forward control switch 76 and a reverse control switch 78. These switches are connected in parallel with each other and in series with the start switch 72 between the battery 64 and the motor control circuits 68. Thus, the traction motor 62 will be energized through the motor control circuit 68 when the key switch 65 and the start switch 72 are closed with either the forward control switch 76 or the reverse control switch 78 closed.

The controller 26 also includes a pump control switch 82 which is serially connected between the key switch 66 and the battery 64 and the pump motor 44. Accordingly, when the pump control switch 82 is opened, the pump motor 44 is turned off and the fluid to the hydraulic system 100 is cut-off.

The pump control switch 82, the forward control switch 76 and the reverse control switch 78 are selectively actuated by the drive selector lever 24. With the drive selector lever in neutral, both the forward switch 76 and the reverse switch 78 are open and the pump control switch 82 is closed. With the selector lever in the forward or reverse positions the respective forward and reverse switches 76 and 78 are closed and the pump switch 82 is closed. With the selector lever in park, the forward and reverse switches 76 and 78 are open and the pump control switch 82 is open.

The selective actuation of the forward and reverse switches 76 and 78 and the pump control switch 82 is also controlled by the seat occupancy detector 32. The occupancy detector is operative, when the selector lever 24 is in neutral, to cause the pump control switch 82 to open and thereby turn off the pump motor 44 when the driver dismounts from the seat. Also, the detector 32 is operative, when the selector lever 24 is in either forward or reverse, in response to the driver dismounting from the seat, to cause the forward and reverse switches 76 and 78 to open and deenergize the traction motor and to cause the pump control switch 82 to open and deenergize the pump motor.

In summary, the electrical circuit of FIG. 3, as just described, is operative to deenergize the traction motor 62 unless the key switch 65 and the start switch 72 and one of the forward or reverse switches 76 or 78, respectively, are all closed. Also, it is operative to deenergize the pump motor 44 unless the key switch 65 and the pump switch 82 are both closed; the pump switch 82 is closed only when the driver's seat is occupied and when the drive selector lever 24 is in forward, reverse or neutral. The pump switch 82 is open when the drive selector lever 24 is in park regardless of driver's seat occupancy. As a result of this control, hydraulic fluid to the hydraulic system 100 is cut-off unless the driver occupies the seat and the drive selector lever 24 is in forward, reverse or neutral.

The Hydraulic System

The hydraulic system 100 includes a power steering circuit for the vehicle, a lift circuit for the lift carriage, a tilt circuit for the upright and an actuation circuit for the auxiliary load handling device. Manual control of the power steering unit 46 is exercised by the steering wheel. Manual control of the lift, tilt and auxiliary load handling functions is exercised by respective hand levers 16, 18 and 22 (see FIG. 2). For this purpose, the steering wheel 14 is coupled with the steering valve 84 for actuation of the valve in response to steering wheel motion. The lift control lever 16 is coupled with a lift valve 86 and the tilt control lever 18 is coupled with a tilt valve 88. Also, the auxiliary control lever 22 is coupled with an auxiliary valve 92.

Before proceeding with the description of the lift valve and the pump speed control, it will be helpful to consider the overall hydraulic system of the lift truck.

Figure 9:
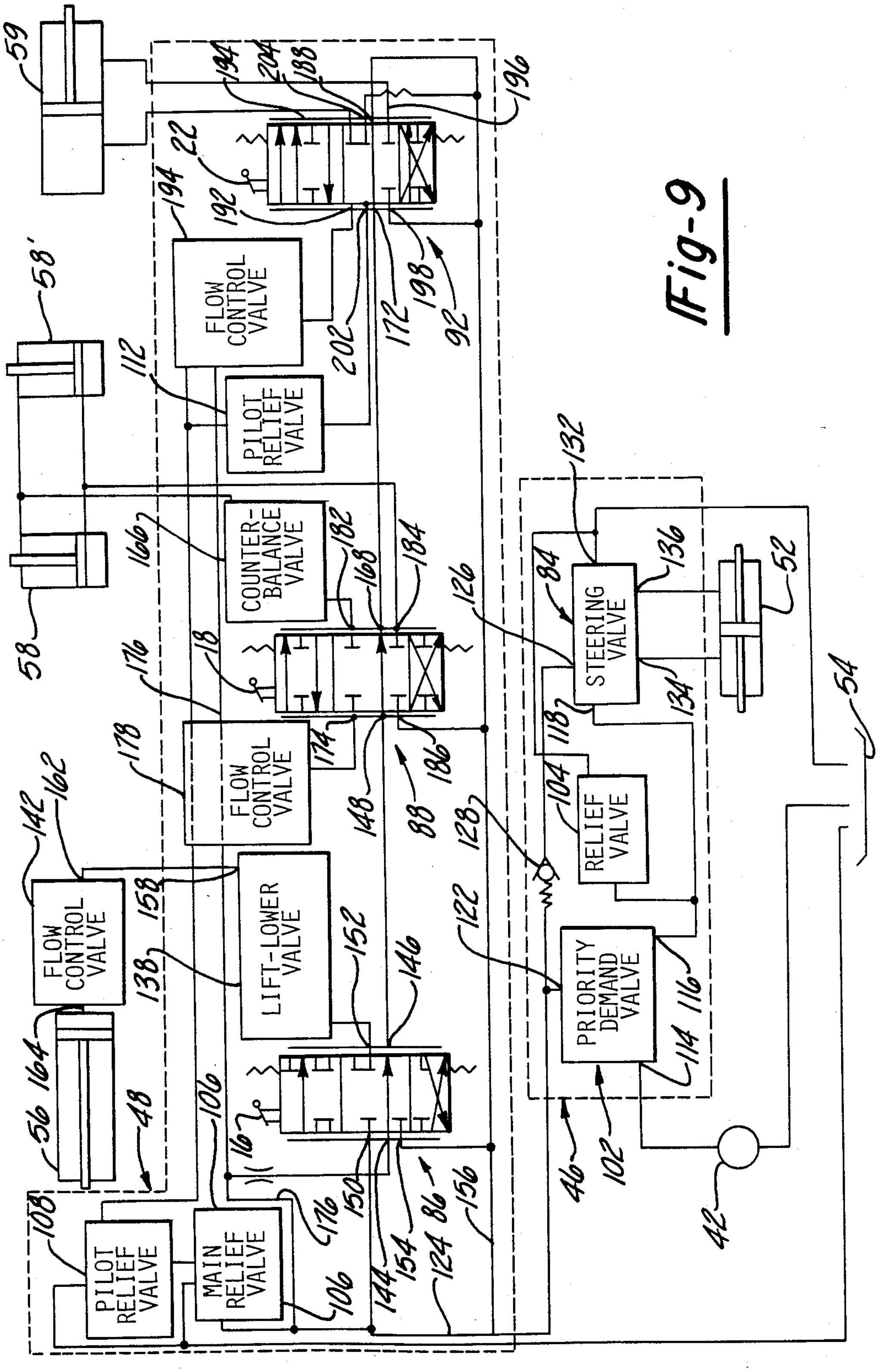
FIG. 9 is a schematic diagram of the hydraulic system.

The hydraulic system is shown schematically in FIG. 9. In general, the system comprises the positive displacement pump 42, the steering unit 46 and the main valve 48. The system also includes the hydraulic reservoir or tank 54.

The hydraulic system is arranged so that the power steering circuit has priority over all other hydraulic functions in the lift truck. For this purpose, a priority demand valve 102 is provided and for design purposes it is located in the steering unit 46. The steering unit 46 also includes a steering valve 84 which controls energization of the steering cylinder 52. The main valve 48 includes the lift control valve 86 which controls the lift cylinder 56 and the tilt control valve 88 which controls the tilt cylinders 58 and 58'. The main valve also includes the auxiliary control valve 92 which controls the auxiliary cylinder 59.

For the purpose of determining flow priority, the priority demand valve 102 is located upstream of the steering control valve 84 and the main valve 48. A pressure relief valve 102 is coupled between the priority demand valve 102 and the steering control valve 84. A two-stage pressure relief valve or hydrastat is loacted in the main valve 48. The two-stage pressure relief valve includes a main relief valve 106 which is controlled by a pilot relief valve 108 and a pilot relief valve 112.

As shown in FIG. 9, the pump 42 has its inlet connected to the tank 54. The outlet of the pump 42 is connected to the inlet port 114 of the priority demand valve 102. The priority demand valve has a primary outlet port 116 connected with the inlet port 118 of the steering control valve 84. It has a secondary outlet port 122 connected through a supply line 124 to a control inlet port 150 of the lift control valve 86. The priority demand valve 102 is adapted to give priority to the flow requirements of the power steering system through the primary outlet port 116. If the input flow to the priority demand valve is greater than that to be allocated to the power steering system, the excess flow is diverted by the priority demand valve to the secondary outlet port 122 and line 124 for use by other hydraulic functions. For example, the power steering circuit may be rated for a maximum of five gallons per minute and a maximum of 1,000 PSI. It will be appreciated that the actual flow and pressure will be determined by the actuation of the steering control valve 84 and the load imposed by the steering system. The flow produced to the inlet port 114 of the priority demand valve 102 depends, of course, upon the speed of the pump 42. As will be described further below, in the example of this illustrative embodiment, operation in a low speed range of about 800 RPM is used for the power steering and tilt functions. This provides about five gallons per minute and the pressure may vary over a range up to 1,000 PSI, depending upon load. Operation of the pump in an intermediate speed range of about 1,200 RPM is used for the auxiliary load device such as a load handling clamp; the flow requirement may be about nine gallons per minute and the pressure may range up to 2,000 PSI. In operation of the pump at high speed, which may be about 1,800 RPM for the lift function, the flow may be about 20 gallons per minute with pressures ranging up to 3,000 PSI.

The power steering circuit comprises the steering control valve 84 and the steering cylinder 52. The steering control valve 84 is a metering valve with an open center spool adapted for bi-directional control of the double-acting steering cylinder 52 for actuating the dirigible wheels of the lift truck. The steering control valve 84 is provided with a primary return port 126 which is connected through a check valve 128 to the supply line 124. The steering control valve 84 is provided with a secondary return port 132 which is connected to the tank 54. The relief valve 104 is provided to prevent excessive pressure in the steering system. For this purpose, it has its inlet port connected to the primary outlet port 116 of the priority demand valve 102. The outlet port of the relief valve 104 is connected to the secondary return port 132. Thus, if the pressure at the primary outlet port 116 of the priority demand valve becomes excessive, the pressure relief valve 104 opens and dumps fluid to the tank. The steering control valve has outlet ports 134 and 136 connected with opposite ends of the steering cylinder 52.

The lift circuit includes the lift control valve 86 which is a metering or proportioning valve having an open center spool. The spool is normally centered and is movable in opposite directions by the lift control lever 16. The lift control valve 86 communicates with the single-ended lift cylinder 56 through a lift-lower valve 138 and a lowering flow control valve 142. The secondary outlet port 122 of the priority demand valve 102 is connected through the supply line 124 to the open center inlet port 144 of the lift control valve 86. The open center outlet port 146 of the valve 86 is connected to the open center inlet port 148 of the tilt control valve 88. The priority demand valve 102 also has its secondary outlet port 122 connected with the control inlet port 150 of the lift control valve 86. The control outlet port 152 is connected with the inlet port of the lift-lower valve 138. The lift control valve 86 has a return line port 154 connected to a return line 156 which goes to the tank 54. The lift-lower valve 138 has a port 158 connected to a port 162 on the lowering flow control valve 142. The lowering flow control valve 142 has a port 164 connected with the lift-lower single ended cylinder 56. Operation of the lift-lower circuit will be described in greater detail subsequently.

The tilt control circuit including the control valve 88 and the auxiliary control circuit including the control valve 92 will be described briefly. The tilt control valve 88 is a metering or proportioning valve of the open center type with a spool which is bi-directionally movable by the tilt control lever 18. The valve 88 communicates with the single ended tilt cylinders 58 and 58' through a counterbalance valve 166. The tilt control valve 88 has an open center inlet port 148 connected with the open center outlet port 146 of the lift control valve 86. The tilt control valve 88 has an open center outlet port 168 which is connected to an open center inlet port 172 on the auxiliary control valve 92. The tilt control valve 92 has a control inlet port 174 connected with the secondary outlet port 122 of the priority demand valve through the supply line 124 to the supply passage 176 and thence through a control valve 178. The tilt control valve 88 has a control outlet port 182 which is connected through the counterbalance valve 166 to the tilt cylinders 58 and 58'. The tilt control valve 88 also includes a return inlet port 184 which is connected with tilt cylinders. A return outlet port 186 on the control valve 88 is connected to the return line 156.

The auxiliary control valve 92 is a metering or proportioning valve having an open center spool which is bi-directionally movable by the auxiliary control lever 22. The control valve 92 is adapted to control the energization of the double-acting auxiliary cylinder 59. The control valve 92 has an open center inlet port 172 which is connected with the open center outlet port 168 of the tilt control valve 88. The control valve 92 also has an open outlet center port 188 which is connected with the return line 156. A control inlet port 192 is connected with the secondary outlet port 122 of the priority demand valve 102. This connection extends through the supply line 124 to the passage 176 and thence through a flow control valve 194 to the control inlet port 192. The control valve 92 has a pair of control ports 194 and 196 which are connected respectively with the opposite ends of the auxiliary cylinder 59. It also has a return outlet port 198 connected with the return line 156. It also has a return inlet port 202 connected with the outlet port of the pilot relief valve 112. Also, the control valve 92 has a return outlet port 204 connected with the return line 156.

The two-stage relief valve, as previously alluded to, comprises a main relief valve 106, a pilot relief valve 108 and a pilot relief valve 112. The two-stage valve is adapted to relieve the pressure at the outlet port 122 of the priority demand valve 102 when it exceeds a predetermined operating value for different operating conditions. In particular, when operating in a lift mode which calls for high speed pump operation the pressure is to be limited, for example, to 3,000 PSI. When operating in the auxiliary mode, the pump is operated at an intermediate speed and the pressure is limited, for example, to 2,000 PSI.

A lift truck with an hydraulic system of the type described above is disclosed in co-pending application U.S. Ser. No. 291,681 filed Aug. 10, 1981 and assigned to the same assignee as this application.

Pump Speed Control

The hydraulic pump 42 is operated at different speeds according to the flow demand which varies with the operating mode of the hydraulic system. When a light load on the hydraulic system is selected, a low motor speed is adequate. For example, in a typical lift truck hydraulic system the power steering circuit requires a maximum of about five gallons per minute. With a positive displacement pump which is sized to deliver 20 gallons per minute at full speed of 1,800 RPM, a pump speed of 800 RPM would be adequate for power steering. Similarly, for other operating modes, such as tilt of the upright, a low pump speed is adequate. For a heavy load on the hydraulic system, such as that imposed by operation in the lift mode either alone or with simultaneous operation in the steering or tilt load, operation of the pump will be required at its maximum rated speed, such as 1,800 RPM. For operation of the hydraulic system with an intermediate load, such as that imposed by operation in an auxiliary mode with a load handling clamp, intermediate flow is required and would be obtained at an intermediate speed, such as 1,200 RPM. Accordingly, the operating speed range of the pump motor is determined by the selection of the operating mode of the hydraulic system. The motor speed control circuit will be described with reference to FIGS. 6, 7 and 8.

Figure 6:
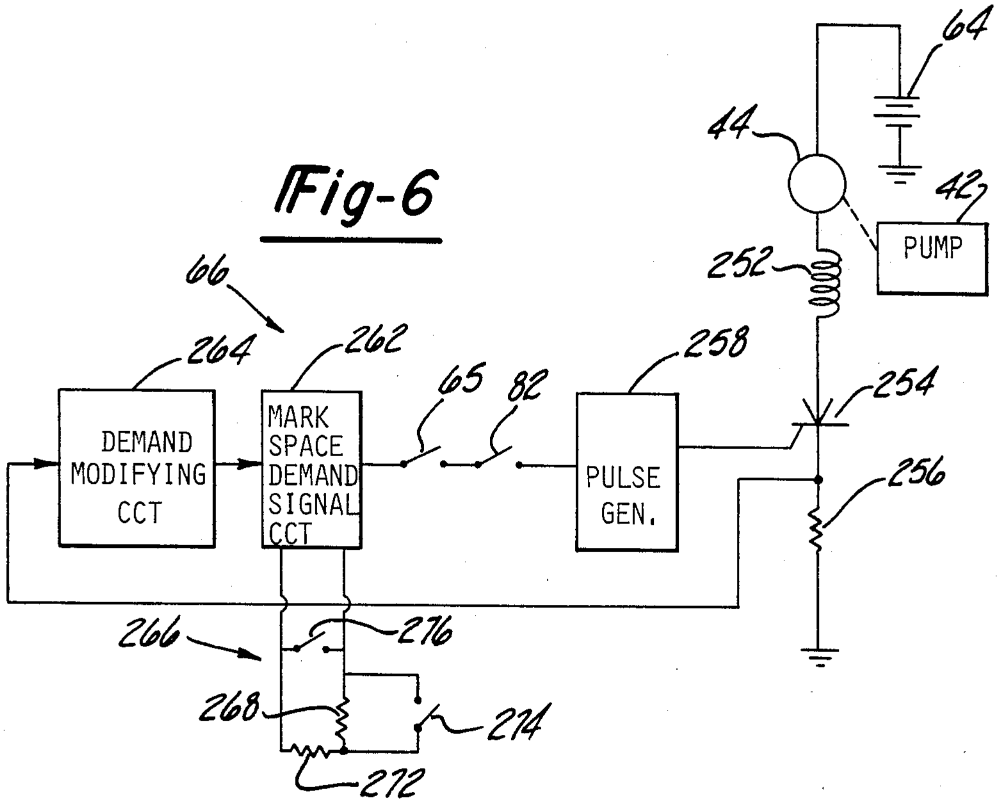
FIG. 6 shows the voltage control circuit for the drive motor of the pump.

As shown in FIG. 6, pump 42 is driven by the series DC motor 44 having a series field winding 252. The motor is energized from the battery 64 through the voltage control circuit 66. The voltage control circuit is adapted to regulate the motor speed within low, intermediate and high speed ranges according to the operating mode of the hydraulic circuit. For this purpose, the voltage control circuit 66 is a thyristor-type pulsing circuit having presettable means for determining a mark/space ratio for the different speed ranges and being provided with a feedback means for changing the mark/space ratio as a function of motor current. Such a motor control circuit is disclosed in the Morton et al U.S. Pat. No. 4,119,898 granted Oct. 10, 1978.

The voltage control circuit 66 comprises a silicon control rectifier (SCR) 254 connected in series with the motor 44. A current sensing resistor 256 is connected in series with the SCR and develops at a feedback voltage corresponding to the value of motor current. A pulse generator 258 supplies a pulse train to the gate of the SCR 254 which controls the effective motor supply voltage in accordance with the mark/space ratio of the pulse train. A mark/space demand signal circuit 262 produces a demand signal which is applied to the pulse generator 258 and determines the mark/space ratio of the pulse train. The value of the demand signal produced by the demand signal circuit 262 is modified by the demand modifying circuit 264 in accordance with the feedback voltage supplied from the sensing resistor 256. The output of the demand signal circuit 262 is connected with the pulse generator 258 through a series connection of the key switch 65 and the pump switch 82 which were described with reference to FIG. 3. Unless both the key switch and the pump switch are closed there is no demand signal input to the pulse generator 258 and the SCR is turned off and the motor 44 cannot be energized. The demand signal circuit 262 is provided with a speed range selection circuit 266. This circuit includes a pair of series resistors 268 and 272. It also includes an intermediate speed selector switch 274 and a high speed selector switch 276. When both switches 274 and 276 are open, the low speed range is selected. When switch 274 is closed with switch 276 open, the intermediate speed range is selected and when the switch 276 is closed the high speed range is selected.

The selector switch 274 is closed by actuation of the auxiliary control lever 22 and the switch 276 is closed by the lift control lever 16, as will be described below.

Figure 7:
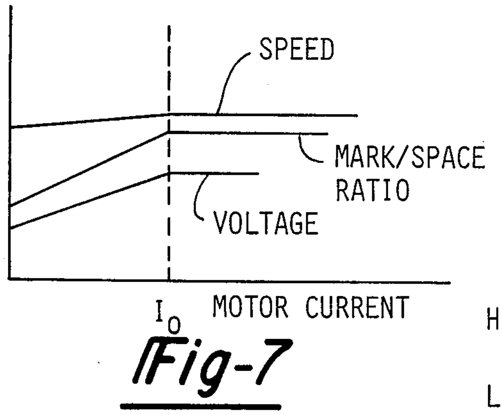
FIG. 7 is a graphical representation of the operational characteristics of the drive motor.
Figure 8:
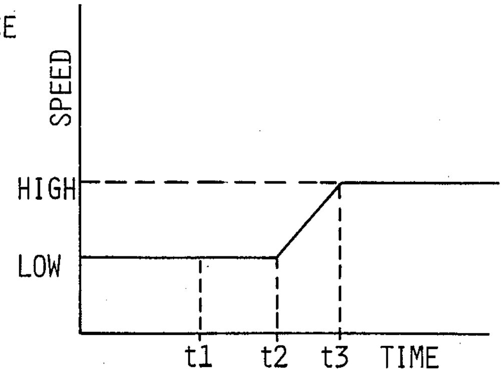
FIG. 8 is a graph of speed change for use in explaining operation of the invention.

In operation of the voltage control circuit 66, the demand modifying circuit 262 produces an output signal which increases in magnitude as a direct function of the feedback voltage from the resistor 256 and hence as a direct function of the motor current. The mark/space demand signal circuit 262 produces a demand signal which increases from a minimum value when the motor current is zero to a maximum value when the motor current reaches a predetermined value $I_O$. This causes the pulse generator 258 to produce a pulse train having a mark/space ratio which increases from a predetermined minimum value to a maximum value in correspondence with a demand signal. The action of the demand modifying circuit 264 in response to the feedback voltage tends to maintain the motor speed substantially constant when it is operated in either the low speed range or the intermediate speed range. This is illustrated for the low speed range in the graph of FIG. 7. As indicated, the mark/space ratio increases with motor current up to a predetermined current of $I_O$ at which point it reaches a maximum value and remains constant. This change of mark/space ratio causes the motor voltage to change accordingly, as indicated in FIG. 7. An increasing load on the motor is reflected by increased current which in turn produces an increased voltage and motor torque which tends to maintain the motor speed substantially constant, as indicated in FIG. 7 for the low speed range. The same relationship obtains when the motor is operated in the intermediate speed range. When the speed selector switch 276 is closed by the lift control lever 16, the demand signal circuit 262 produces a demand signal corresponding to the high speed range. In this latter condition, the full battery voltage is applied to the pump motor so that the pump is operated at the highest speed capability of the motor for the particular load.

The Lift Control Valve And Lever

Figure 4:
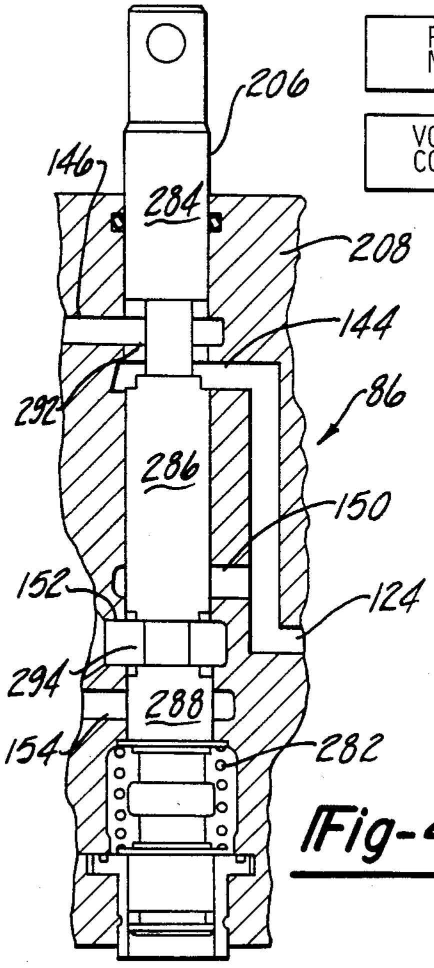
FIG. 4 is a cross-sectional view of a lift valve.
Figure 5:
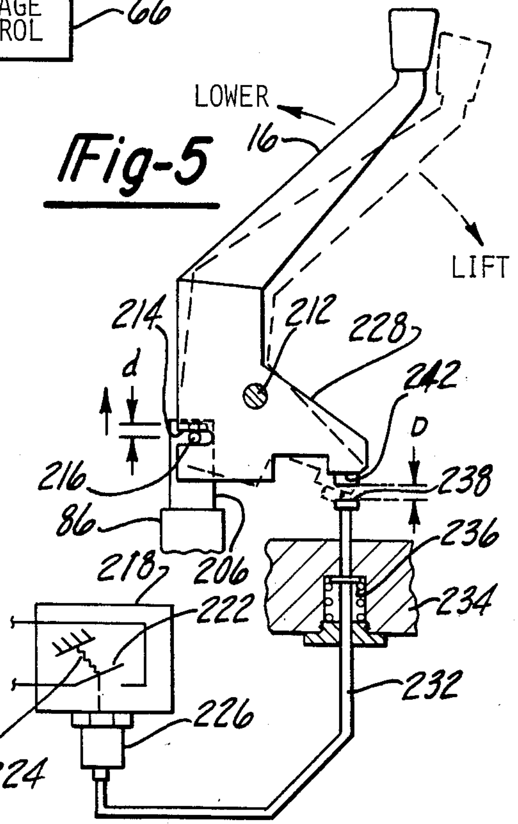
FIG. 5 shows the lift control lever and associated speed selector switch.

The lift control lever 16, alluded to with reference to FIGS. 1 and 2, is shown in greater detail in FIG. 5. The lift control lever is adapted to actuate the lift control valve 86 and to exercise manual control over the operating speed of the pump motor. The lift control valve 86, as previously noted, is a spool valve having a spool 206. The spool is axially movable in either direction from a neutral position to select either the lift mode or the lower mode of operation. The lift control valve 86 will be described in greater detail with reference to FIG. 4.

The structure of the lift control valve 86 is depicted in FIG. 4. The lift control valve 86 is a conventional proportioning valve of the open-center, spool type and comprises a valve spool 206 in a valve body 208. The spool 206 as shown in FIG. 4 is in a neutral position and is biased toward that position by a centering spring 282. The valve body 208 is provided with the supply line 124 which supplies fluid pressure from the secondary outlet port 122 of the priority demand valve 102. The supply line 124 is connected with the open center inlet port 144 and also with the control inlet port 150. The valve body 208 also provides an open center outlet port 146 which is connected with the open center inlet port 148 of the tilt control valve 88, as previously described. A control outlet port 152 is connected with the lift cylinder 56 through the lift-lower valve 138 and the lower control valve 142, as previously described. A return line port 154 is connected with the return line 156, as previously described.

The valve spool 206 comprises cylindrical sections 284, 286 and 288. The spool defines an annular chamber 292 between the sections 284 and 286 and an annular chamber 294 between the sections 286 and 288. With the spool 206 in the neutral position shown, the open center outlet port 146 is fully open through the chamber 292 to the open center inlet port 144. Also, in the neutral position, the control outlet port 152 is fully closed by the spool section 286 to the control inlet port 150 and the return line port 154 is fully closed by the spool section 288 to the control outlet port 294. In this condition, herein referred to as the "fully closed" condition, there is no flow to the lift cylinder 56 and there is full flow to the tank 54. The valve spool 206 is movable by actuation of the lift lever 16 to a "fully open" condition by moving the spool 206 upwardly (as viewed in FIG. 4) until the open center inlet port 144 is fully closed to the open center outlet port 146 by the spool section 286. With the spool in this position, the control outlet port 152 is fully open to the control inlet port 150 through the chamber 152 and the return line port 154 remains closed by the spool section 288. In this position, the valve is referred to as being "fully open".

When the control valve is actuated by the lift lever 16 between the fully closed and fully open conditions, the fluid flow to the lift cylinder 56 is controlled in a proportional manner. With the spool 206 in the neutral position, the valve is fully closed and the fluid flows freely through the open center inlet port 144 to the open center outlet port 146 and there is no flow to the control outlet port 152. Upward movement of the spool 206 results in restricted flow from the open center inlet port 144 to the open center outlet port 146 which causes a back-pressure in the fluid and there is restricted flow from the control inlet port 150 to the control outlet port 152. As the spool 206 is moved further, the back-pressure increases and there is less restriction to the flow between the control inlet port 150 and outlet port 152 so that the flow to the lift cylinder 56 is a direct function of the displacement of the spool. This so-called proportional control permits the driver to gradually increase the fluid pressure in the lift cylinder 56 and thus to exercise "feathering" control in raising the lift carriage. When the lift carriage is to be lowered, the lift lever 16 is moved in the lowering direction to move the spool 206 past the neutral position. This movement causes the spool section 284 to close the open center outlet port 146 to the open center inlet port 144 and at the same time to open the return line port 154 to the control outlet port 152 through the chamber 294 so that the fluid pressure in the lift cylinder 56 is released. The driver may also exercise feathering control during the operation in the lowering mode.

The lift control lever 16 is pivotally mounted on a shaft 212 for pivotal motion in the fore and aft directions by the lift truck driver. The lever 16 is provided with a slot 214 which receives a pin 216 extending through the end of spool 206 of the control valve. Accordingly, when the control lever 16 is pivoted in the rearward direction (phantom lines) the stem 206 is raised from the neutral position and the valve is operated in the lift mode. When the hand lever 16 is rotated in the forward direction, the stem 206 is lowered and the valve is operated in the lowering mode.

When the system is operated in the lift mode, the pump 42 is operated in the high speed range. For this purpose, a speed control switch 218 is provided. As will be described subsequently, the speed control switch 218 is electrically connected in the speed control circuit which will be described with reference to FIG. 6. The speed control switch comprises switch contacts 222 which are biased by a spring 224 toward a closed position. A switch plunger 226 is adapted, when depressed, to hold the switch contacts 222 in the open position.

When the speed control switch 218 is closed, the speed control circuit causes the pump motor 42 to operate in the high speed range. The lift lever 16 is adapted to close the speed control switch 218 concurrently with full opening of the valve 86. For this purpose, the control lever 16 is provided with an arm 228 which actuates a push rod 232. The push rod, in turn, actuates the switch plunger 226. The push rod is mounted in the control lever housing 234 for reciprocal motion and is spring loaded by a bias spring 236 in the upward direction. With the lever 16 in the neutral position, the upper end 238 of the push rod 32 is spaced from the lower face 242 of the arm 228. This provides a lost motion of predetermined distance D, as indicated in FIG. 5, between the control lever 16 and the push rod 232. When the control lever is pivoted rearwardly from the neutral position the first increment of motion imparts movement to the stem 206 of the lift control valve 86. Continued movement of the control lever 16 operates the valve 86 in its feathering mode between the closed and open positions. When the valve stem 206 is moved a distance D, as indicated in FIG. 5, the valve is fully open and the arm 228 of the control lever 16 engages the push rod 232 (phantom lines). Upon engagement of the push rod 232 by the control lever 16, the push rod 232 is depressed against the resistance of the bias spring 236 and the lower end of the push rod moves away from the switch plunger 226 allowing the switch contact 222 to close. This closure of the speed control switch 218 causes the motor control circuit to operate the motor in the high speed range. Thus, the pump motor 42 is operated in the high speed range when the lift control valve is fully open to apply maximum lifting force to the lift carriage.

When the control handle 16 is returned to the neutral position after operating in the lift mode, the control valve 86 is returned to its neutral position in which the valve is closed. This movement of the control lever 16 allows the speed control switch 218 to open and the motor control circuit is switched for operation in the lower speed range. When the control lever 16 is operated to lower the carriage by pivotal motion in the forward direction from the neutral position, the spool is moved downwardly and the cylinder port is connected to the tank return port. This releases fluid from the lift cylinder to lower the load carriage. The control valve 86 may be operated in a proportional manner for feathering the lowering control of the load carriage.

Operation

In operation, the lift truck driver may operate the lift lever 16 to raise the lift carriage while the pump motor is operated in the low speed range. The low speed motor operation obtains when the lift truck is operated in the idle mode (key switch 66 and pump switch 82 closed), power steering mode, or the tilt mode, or any combination of these modes. When the driver actuates the lift lever 16, the lift control valve 86 is moved from the fully closed position to the fully open position through its feathering range while the pump motor is operated in the low speed range. As the lift control valve is opened, the pressure in the lift cylinder 56 is progressively increased causing the load on the motor to increase. The motor speed control system increases the motor torque with increased load to maintain the motor speed substantially constant within the low speed range. This enables the lifting of heavy loads with the pump operating in the low speed range. When the lift control valve 86 reaches the fully open position, the speed control switch 276 is closed and the motor speed control circuit 66 is switched to operate in the high speed range. Accordingly, the motor speed is increased from the low speed range to the high speed range only after the control valve is fully open. This operation is depicted graphically in FIG. 8. With the motor operated in the low speed range, the driver commences to move the lift lever 16 in the lift direction at time t 1. The lift lever is moved gradually for feathering control so that the lift control valve moves from fully closed to fully open in the interval between time t 1 and time t 2. When it is fully open at time t 2, the speed control switch 276 is closed and the motor speed increases in a ramp fashion to its maximum speed at time t 3 and remains substantially constant at that speed. It will now be appreciated that similar operation will be obtained if the lift truck driver actuates the lift control lever 16 when the pump mctor is operated in the intermediate speed range. In such case, the feathering operation of the lift control valve takes place at the relatively lower intermediate pump speed and the high speed pump operation is not initiated until the control valve is fully open.

Although the description of this invention has been given with reference to a particular embodiment, it is not to be construed in a limiting sense. Many variations and modifications of this invention will now occur to those skilled in the art. For a definition of the invention reference is made to the appended claims.

What is claimed is:

1. An hydraulic system of the type having first and second hydraulic load circuits, the second circuit having a greater hydraulic flow requirement than the first circuit, a positive displacement hydraulic pump connected with the load circuits, a changeable speed electric motor connected with the pump, said pump being adapted to supply the flow required by the first load circuit when the motor is operated in a low speed range and to supply the flow required by the second load circuit when the motor is operated in a high speed range, a proportioning valve for controlling flow from the pump to the second load circuit, said valve having an inlet port in fluid communication with the pump outlet, a return port in fluid communication with the pump inlet and a load port in fluid communication with said second load circuit, said valve including means for progressively opening the load port while progressively closing the return port, and control means for energizing the motor of operation in the low speed range during opening of the load port and for energizing the motor for operation in the high speed range only when the load port is fully open and the return port is fully closed, said control means including regulating means for maintaining the speed of the electric motor substantially constant in said low speed range during said opening of the load port, whereby the pump is operated in the low speed range during transition of the return outlet from open to close to reduce the energy loss during the transition.

2. The invention as defined in claim 1 wherein said control means includes:

a first manually actuable device for controlling fluid flow to the first load circuit;

a second manually actuable device coupled with the movable means of the proportioning valve for movement thereof, and switching means for energizing said mtoor for operation in the high speed range when the proportioning valve is fully open.

3. The invention as defined in claim 2 wherein:

said second manually actuable device coacts with said swtiching means for causing the motor to be energized for operation in the high speed range when the proportioning valve is fully open.

4. The invention as defined in claim 1 wherein:

said control means includes regulating means for maintaining the speed of the electric motor within first predetermined limits during operation in the high speed range and within second predetermined limits during operation in the low speed range.

5. The invention as defined in claim 4 wherein:

said electric motor is a series DC motor, said energizing means is a battery, and said regulating means includes means for applying DC pulses of variable mark/space ratio to the motor and means responsive to the motor current for adjusting the mark/space ratio to regulate the motor speed within said predetermined limits.

6. In a work vehicle of the type having first and second hydraulic load circuits, said second load circuit having a greater hydraulic flow requirement than the first circuit, a positive displacement hydraulic pump for supplying pressurized fluid to the load circuits, a changeable speed electric motor connected with the pump, said pump being adapted to supply the flow required by the first load circuit when the motor is operated in a low speed range and to supply the flow required by the second load circuit when the motor is operated in a high speed range, a first manually actuable selector means for operatively coupling the first load circuit with said pump;

an open center proportioning valve for controlling flow from the pump to the second load circuit, said valve having a valve body including an inlet port in fluid communication with the pump outlet a return port in communication with the pump inlet and a load port in communication with a load device, said valve including a spool movable between a closed position and a fully open position, said closed position having the load port closed to the inlet port and the return port open to the inlet port, said open position having the load port open to the inlet port and the return port closed to the inlet port, a second manually actuable selector means coupled with said spool for moving it between the closed and open positions for progressively decreasing the flow to the return port and increasing the flow to the load port, and motor speed control means including switching means for operating the motor in the high speed range when the switching means is activated, said second selector means being coupled with the switching means for activating the switching means only when the spool reaches the fully open position, said control means including regulating means for maintaining the speed of the electric motor substantially constant in said low speed range during said opening of the load port, whereby the pump is operated in the low speed range during transition of the return outlet from open to close to reduce the energy loss during the transition.

7. The invention as defined in claim 6 wherein said control means comprises:

regulating means for maintaining the speed of the electric motor within the first predetermined limits during operation in the high speed range and within second predetermined limits during operation in the low speed range.

8. The invention as defined in claim 7 wherein:

said electric motor is a series DC motor, said energizing means is a battery, and said regulating means includes means for applying DC pulses of variable mark/space ratio to the motor and means responsive to the motor current for adjusting the mark/space ratio to regulate the motor speed within said predetermined limits.

9. The invention as defined in claim 6 wherein:

said vehicle is a lift truck, said first load circuit is a power steering circuit and the first manually actuable selector comprises a steering wheel, said second load circuit is a lift circuit and said second manually actuable selector comprises a lift control lever.

* * * * *